US012598180B2

(12) United States Patent
Tiwari et al.

(10) Patent No.: US 12,598,180 B2
(45) Date of Patent: Apr. 7, 2026

(54) PAIRED DEVICE MULTI-FACTOR AUTHENTICATION USING BLUETOOTH

(71) Applicant: Cisco Technology, Inc., San Jose, CA (US)

(72) Inventors: Jay Prakash Tiwari, Princeton, NJ (US); Praveen Kumar Sheena Poojary, Jersey city, NJ (US); Senthil Kumar Chadramohan, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 229 days.

(21) Appl. No.: 18/123,023

(22) Filed: Mar. 17, 2023

(65) Prior Publication Data

US 2024/0314123 A1     Sep. 19, 2024

(51) Int. Cl.
| | |
|---|---|
| *H04L 9/40* | (2022.01) |
| *H04W 4/80* | (2018.01) |
| *H04W 12/06* | (2021.01) |

(52) U.S. Cl.
CPC ........ *H04L 63/0869* (2013.01); *H04L 63/083* (2013.01); *H04W 4/80* (2018.02); *H04W 12/06* (2013.01)

(58) Field of Classification Search
CPC .... H04L 63/0869; H04L 63/083; H04W 4/80; H04W 12/06
See application file for complete search history.

(56) References Cited

U.S. PATENT DOCUMENTS

| | | | |
|---|---|---|---|
| 8,467,770 B1 * | 6/2013 | Ben Ayed | ............... G06F 21/35 455/411 |
| 8,595,810 B1 | 11/2013 | Ben Ayed | |
| 9,075,979 B1 | 7/2015 | Queru | |
| 9,525,972 B2 | 12/2016 | Raounak | |
| 9,571,282 B1 | 2/2017 | Aggarwal et al. | |
| 9,722,984 B2 | 8/2017 | Burch et al. | |

(Continued)

FOREIGN PATENT DOCUMENTS

WO     WO2019191394 A1     10/2019

OTHER PUBLICATIONS

Ghose et al., "ZITA: Zero-Interaction Two-Factor Authentication Using Contact Traces and In-Band Proximity Verification", IEEE Transactions on Mobile Computing (vol. 23, Issue: 5, 2024, pp. 6318-6333), Electronic Publication Date: Oct. 2, 2023. (Year: 2023).*

(Continued)

*Primary Examiner* — Chau Le
(74) *Attorney, Agent, or Firm* — Lee & Hayes, P.C.

(57) ABSTRACT

Techniques for determining whether to send an MFA push notification are described. An indication of a request for a user account to access the application service via a primary device is received at an MFA service from an application service. Using a PAN protocol, determine whether the primary device and the secondary device are within a threshold proximity. When the primary device and the secondary device are within the threshold proximity, allows a push notification to be transmitted to the secondary device requesting authentication to grant access to the user account by the primary device, and when the primary device and the secondary device are not within the threshold, refrain from transmitting the push notification.

20 Claims, 5 Drawing Sheets

(56) References Cited

U.S. PATENT DOCUMENTS

| | | | |
|---|---|---|---|
| 10,097,538 B1 | 10/2018 | Sanchez | |
| 10,142,794 B1 | 11/2018 | Diamanti et al. | |
| 10,206,099 B1* | 2/2019 | Trinh | H04W 4/021 |
| 10,212,591 B1* | 2/2019 | Queru | H04W 12/065 |
| 10,657,242 B1* | 5/2020 | Xia | H04L 9/0825 |
| 10,701,067 B1* | 6/2020 | Ziraknejad | H04W 12/63 |
| 10,771,458 B1* | 9/2020 | Xia | H04W 12/64 |
| 10,812,476 B2 | 10/2020 | Alexander | |
| 10,887,307 B1 | 1/2021 | Newstadt et al. | |
| 11,140,157 B1* | 10/2021 | Xia | H04L 63/0853 |
| 11,140,175 B2* | 10/2021 | Zhong | G07C 9/29 |
| 11,483,707 B2 | 10/2022 | Leblang et al. | |
| 11,496,462 B2 | 11/2022 | Lee et al. | |
| 11,805,112 B2 | 10/2023 | Zacks et al. | |
| 12,003,512 B2 | 6/2024 | Anani et al. | |
| 2010/0278345 A1 | 11/2010 | Alsina et al. | |
| 2013/0169434 A1 | 7/2013 | McCown et al. | |
| 2015/0106900 A1 | 4/2015 | Pinski et al. | |
| 2015/0215299 A1 | 7/2015 | Burch et al. | |
| 2015/0256973 A1* | 9/2015 | Raounak | H04W 12/069 |
| | | | 726/7 |
| 2015/0371026 A1* | 12/2015 | Gnanasekaran | G06F 21/35 |
| | | | 726/7 |
| 2015/0381633 A1* | 12/2015 | Grim | H04L 63/0861 |
| | | | 726/4 |
| 2016/0021103 A1 | 1/2016 | Koneru | |
| 2016/0286393 A1 | 9/2016 | Rasheed et al. | |
| 2017/0032111 A1 | 2/2017 | Johansson et al. | |
| 2017/0126640 A1* | 5/2017 | Vincent | H04L 63/083 |
| 2018/0007060 A1 | 1/2018 | Leblang et al. | |
| 2018/0013782 A1 | 1/2018 | Choyi et al. | |
| 2018/0293367 A1 | 10/2018 | Urman | |
| 2019/0166118 A1 | 5/2019 | Lee et al. | |
| 2019/0188368 A1 | 6/2019 | Hastings | |
| 2019/0213318 A1* | 7/2019 | Gnanasekaran | H04W 12/06 |
| 2019/0305955 A1 | 10/2019 | Verma et al. | |
| 2019/0372959 A1 | 12/2019 | Pattar et al. | |
| 2020/0186520 A1 | 6/2020 | Oberheide et al. | |
| 2020/0233949 A1 | 7/2020 | Xia et al. | |
| 2020/0404003 A1* | 12/2020 | Alameh | H04L 9/0819 |
| 2021/0136060 A1 | 5/2021 | Raounak | |
| 2021/0350013 A1 | 11/2021 | Lakhani et al. | |
| 2022/0027498 A1* | 1/2022 | Vandanapu | H04L 9/0643 |
| 2022/0255913 A1 | 8/2022 | Zacks et al. | |
| 2022/0255922 A1 | 8/2022 | Zacks et al. | |
| 2022/0272101 A1 | 8/2022 | Cuan et al. | |
| 2022/0345464 A1* | 10/2022 | Davenport | H04L 63/0861 |
| 2022/0385656 A1 | 12/2022 | Gujarathi | |
| 2022/0408259 A1* | 12/2022 | Adel | H04W 12/0431 |
| 2023/0041559 A1 | 2/2023 | Burgess et al. | |
| 2024/0137365 A1 | 4/2024 | Neighbour et al. | |
| 2024/0195797 A1 | 6/2024 | Miel et al. | |
| 2024/0314118 A1 | 9/2024 | Keshet | |
| 2024/0314138 A1 | 9/2024 | Tiwari et al. | |

OTHER PUBLICATIONS

Shah et al., "Wi-Access: Second Factor User Authentication leveraging WiFi Signals," 2018 IEEE International Conference on Pervasive Computing and Communications Workshops (PerCom Workshops), Athens, Greece, 2018, pp. 330-335, doi: 10.1109/PERCOMW.2018.8480152, Publication Date Oct. 7, 2018. (Year: 2018).*

Search Report and Written Opinion for International Application No. PCT/US2024/019696, Dated May 16, 2024, 14 pages.

Office Action for U.S. Appl. No. 18/122,990, Dated Feb. 10, 2025, Tiwari, "Global Positioning System Based Multi-Factor Authentication for Zero Trust Network Access ," 19 pages.

Search Report and Written Opinion for International Application No. PCT/US2024/019666, Dated May 13, 2024, 13 pages.

* cited by examiner

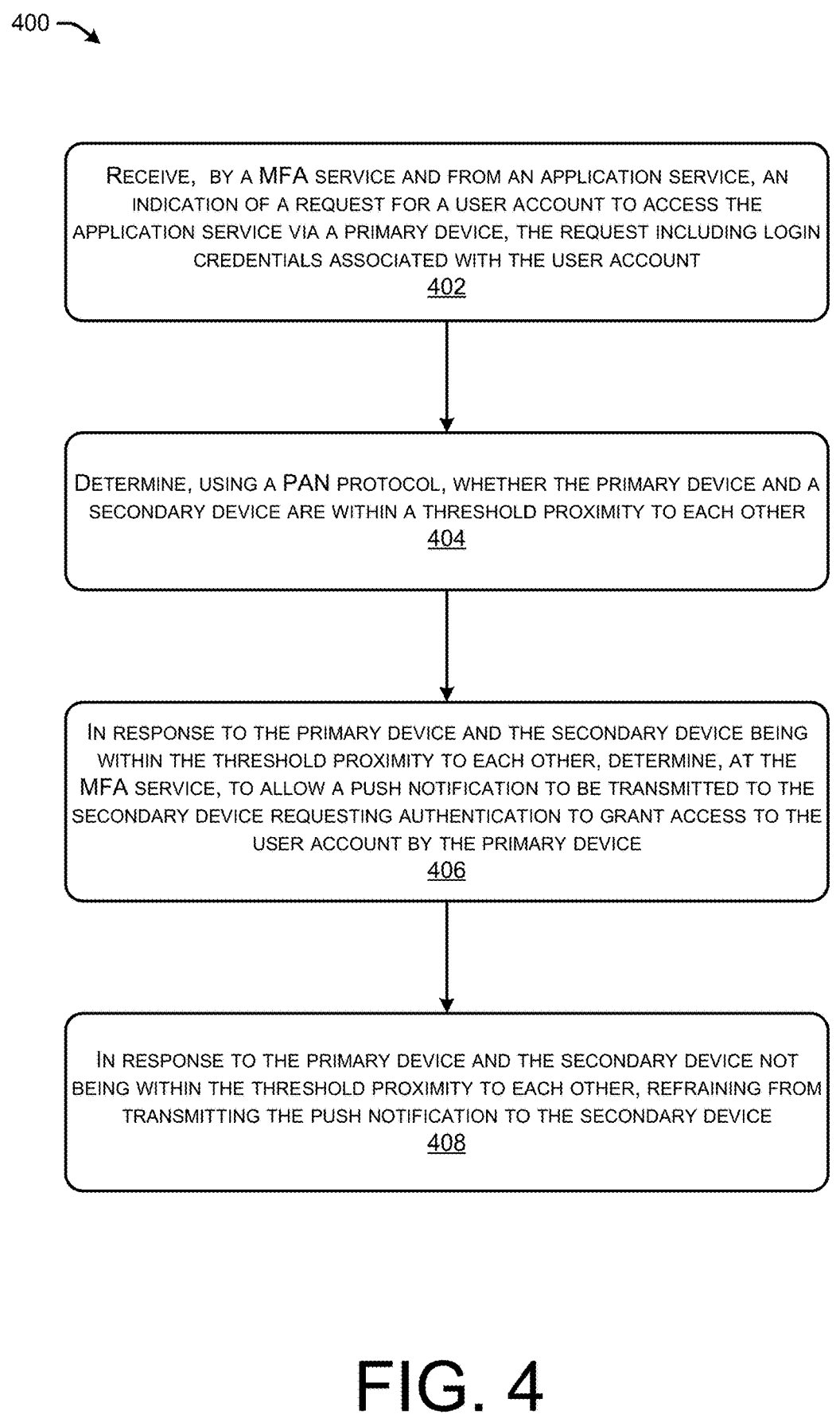

400 ⤵

RECEIVE, BY A MFA SERVICE AND FROM AN APPLICATION SERVICE, AN INDICATION OF A REQUEST FOR A USER ACCOUNT TO ACCESS THE APPLICATION SERVICE VIA A PRIMARY DEVICE, THE REQUEST INCLUDING LOGIN CREDENTIALS ASSOCIATED WITH THE USER ACCOUNT
402

DETERMINE, USING A PAN PROTOCOL, WHETHER THE PRIMARY DEVICE AND A SECONDARY DEVICE ARE WITHIN A THRESHOLD PROXIMITY TO EACH OTHER
404

IN RESPONSE TO THE PRIMARY DEVICE AND THE SECONDARY DEVICE BEING WITHIN THE THRESHOLD PROXIMITY TO EACH OTHER, DETERMINE, AT THE MFA SERVICE, TO ALLOW A PUSH NOTIFICATION TO BE TRANSMITTED TO THE SECONDARY DEVICE REQUESTING AUTHENTICATION TO GRANT ACCESS TO THE USER ACCOUNT BY THE PRIMARY DEVICE
406

IN RESPONSE TO THE PRIMARY DEVICE AND THE SECONDARY DEVICE NOT BEING WITHIN THE THRESHOLD PROXIMITY TO EACH OTHER, REFRAINING FROM TRANSMITTING THE PUSH NOTIFICATION TO THE SECONDARY DEVICE
408

FIG. 4

PAIRED DEVICE MULTI-FACTOR AUTHENTICATION USING BLUETOOTH

TECHNICAL FIELD

The present disclosure relates generally to techniques for, among other things, using Bluetooth pairing information between a primary device and a secondary device to allow or deny MFA push notifications to be sent to allow or deny connections to network resource(s), and to terminate connections based on paired device monitoring.

BACKGROUND

Multi-Factor Authentication (MFA) techniques are becoming increasingly prevalent as a means of procuring access to electronic devices, applications, and the like. MFA is an electronic authentication method in which a user is granted access after successfully presenting two or more pieces of evidence (e.g., factors) to an authentication mechanism. MFA combines two or more independent credentials. For example, the credentials may include presenting knowledge (e.g., something only the user knows such as a password), possession (e.g., something only the user has such as a security token), and/or inherence (e.g., something only the user is such as using biometric verification). Techniques for providing a two-factor authentication often involve the use of electronic devices. For example, MFA techniques may require a user to confirm a push notification sent to a possession (e.g., a mobile device) of the user (e.g., something only the user has).

The goal of MFA is to present multiple defenses that make it more difficult for an unauthorized person to access a target. If one factor is compromised (e.g., a password is stolen) the attacker still has at least one more barrier to breach before successfully breaking into the target. For example, if an unauthorized perpetrator has stolen a password for an account that is not theirs, they may attempt to log into the account using the correct password, but with MFA a push notification may be sent to a second device, such as a cell phone, registered to a user associated with the account, requesting a second factor (e.g., a biometric verification) before the account can be accessed. As the cell phone will typically be physically with the user associated with the account, the user will know not to provide the second factor and the perpetrator will be unsuccessful.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 is a flow diagram illustrating an example method associated with the techniques described herein for device proximity based Multi-Factor Authentication for zero trusted access.

DESCRIPTION OF EXAMPLE EMBODIMENTS

Overview

Figure 1:
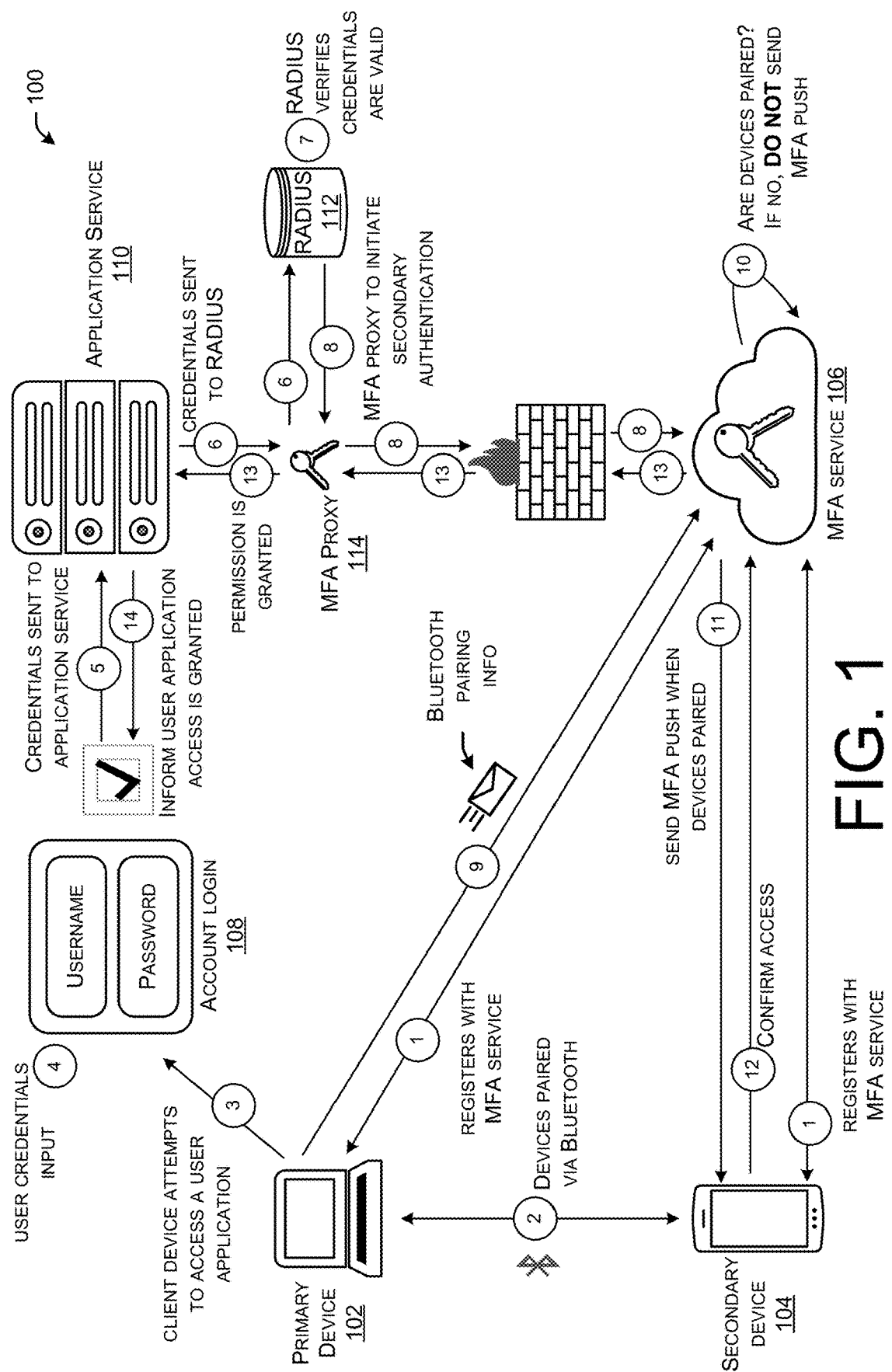
FIG. 1 illustrates an example architecture that may implement various aspects of the technologies directed to using device proximity of a primary device and a secondary device that are both registered with an MFA service to allow or deny MFA push notifications to be sent to allow or deny connections to network resource(s), and to terminate connections based on device proximity monitoring as described herein.

This disclosure describes various techniques for determining whether to send an MFA push notification to an MFA registered device based on the proximity determined by Bluetooth pairing information between a primary device attempting access to an account and the MFA registered device. By way of example, and not limitation, the techniques described herein may include receiving, by a Multi-Factor Authentication (MFA) service and from an application service, an indication of a request for a user account to access the application service via a primary device, the request including login credentials associated with the user account. The techniques may also include determining, using a personal area networking (PAN) protocol, whether the primary device and the secondary device are within a threshold proximity to each other. In response to the primary device and the secondary device being within the threshold proximity to each other, the techniques may include determining, at the MFA service, to allow a push notification to be transmitted to the secondary device requesting authentication to grant access to the user account by the primary device. In response to the primary device and the secondary device not being within the threshold proximity to each other, the techniques may include refraining from transmitting the push notification to the secondary device.

Additionally, the techniques described herein may be performed as a method and/or by a system having non-transitory computer-readable media storing computer-executable instructions that, when executed by one or more processors, performs the techniques described above and herein.

EXAMPLE EMBODIMENTS

As noted above, MFA techniques are becoming increasingly prevalent as a means of procuring access to electronic devices, applications, and other secured resources. While the goal of MFA is to present multiple defenses that make it more difficult for an unauthorized person to access a target, there are still situation in which a perpetrator is able to get around the multiple layers of defense. One popular way in which hackers get around MFA is a technique known as MFA fatigue. When an application's MFA is configured to use push notifications, a user of a legitimate account sees a prompt on their mobile device when someone tries to log in with the user's credentials (e.g., username and password).

These MFA push notifications ask the user to verify the login attempt and will show where the login is being attempted. An MFA Fatigue attack is when a hacker attempts to log in with stolen credentials over and over, by running a script for example. This results in an endless stream of MFA push requests sent to a mobile device of the account owner. The endless stream of push requests is designed to break down the target's cybersecurity posture and inflict a sense of "fatigue" regarding the push requests. Ultimately the target may become so overwhelmed that they accidentally approve or accept an MFA request to stop the endless stream of notifications they are receiving. MFA fatigue has proven to be a very successful technique for breaching large well-known organizations.

Additionally, once a legitimate workflow has been authenticated based on a successful MFA authentication, there is no way to continuously monitor the authenticated workflow and terminate the session if a security policy violation occurs, such as when the authenticated user of a primary device is away from or not within a proximity of the primary device. As an example, a user may start a session with Office365 on their computer (e.g., laptop, desktop, etc.) and authenticate the session by responding positively to an MFA notification pushed to their cell phone. However, at some point after the session has been authenticated and while the session is still active, the user may leave the room or even the premises where their computer is located, thereby leaving their computer unattended with an active Office365 session running and vulnerable to access by unauthorized users.

This disclosure is directed to techniques that, among other things, utilize the proximity of a primary client or primary device (e.g., a laptop a user in attempting to log into a user account with) to a secondary or secondary device (e.g., authenticating device, the cell phone in the above example) which is registered with an MFA service to allow or deny connections to secured resource(s), as well as terminate existing connections to the secured resource(s) (e.g., application(s), service(s), etc.). In some examples, the technologies described in this disclosure may include determining whether a primary device and a secondary device are within a close proximity to one another based on Bluetooth pairing information to determine whether to send a push notification to the secondary device in order to complete an MFA and allow connection to the secured resource requested by the primary device. Additionally, the Bluetooth pairing information for of the primary device and the secondary device may be continuously monitored throughout the life of the authenticated session such that when the secondary device moves away from the primary device and is more than a threshold proximity away from the primary device, Bluetooth pairing will be terminated, and the existing session may be terminated.

As used herein, the term "primary device" means the authenticated device that is attempting to establish an authenticated/secured session. Additionally, the term "secondary device" means the authenticating device that may receive an MFA push notification to authenticate the session for the primary device. In many cases, a primary device would be a user's laptop or desktop computer, and a secondary device would be the user's cell phone or other mobile device (e.g., tablet). However, it is to be understood that other combinations of primary and secondary devices exist, as those having ordinary skill in the art will understand. For instance, a cell phone or tablet may be a primary device and a laptop or desktop computer may be a secondary device in an MFA workflow, in some examples. As another example, a tablet may be a primary device and a cell phone may be a secondary device, in some instances. Additionally. Bluetooth pairing is used here to describe techniques for determining whether a primary and secondary device are within a close, or threshold, proximity to one another, however, other means may be used that also create a personal area network (PAN) that includes the primary device and secondary device and ensures that the primary device and secondary device are within a close threshold proximity to one another.

Turning back to the above-described example, in response to the user leaving the room or the premises where their computer is located, the technologies described in this disclosure would cause the user's Office365 session to be terminated, at least assuming that the user has taken their cell phone with them upon leaving their computer unattended. Upon the user leaving the room or the premises where the computer is located, and assuming that the user took their cell phone with them, the connection would fail as the cell phone moved out of the threshold proximity of the computer resulting in a Bluetooth connection being broken. In response to this, the Office365 session would be terminated.

To implement techniques described herein, a user may register a device with an MFA service. For example, a user typically will register their cell phone with the MFA service for use as a secondary device for MFA authentication. Additionally, other primary devices may also be registered with an MFA service. For example, a laptop or other computing device dedicated to a user's employment activities that may routinely connect to secure resources, may also be registered with the MFA service. However, techniques describe herein may be implemented with primary devices that may not be registered with the MFA service.

The MFA service will send a push notification, to authenticate an attempted login of a user account, to a secondary registered device when an attempt is made on a primary device to login to an account associated with the user. When an application service receives a request for a user account to access the application service via a primary device, the request to access the application service includes login credential for the user account, for example a username and password. Continuing with the above example, when a user attempts to login to an Office365 account at a laptop with the user's username and password, the application service receives the credential (username and password) and sends them to a Remote Authentication Dial-In User Service (RADIUS) or equivalent, for verification. If the login credentials are valid the RADIUS server will request an MFA proxy to initiate a secondary authentication. The MFA service receives the request to send a push notification to a secondary device registered as an authenticator for the user account that the primary device is requesting to access. When the MFA service receives the request, the MFA service determined whether the primary device and the secondary device are within close proximity by determining whether the primary device and secondary device are paired via Bluetooth.

If the MFA service determines that the requesting primary device and the secondary device are within the threshold proximity the MFA service will send a push notification to the secondary device requesting secondary authentication. In this case, when the primary device and the secondary device are within the threshold proximity, the MFA service can conclude with relative certainty, that the actual user associated with the user account being accessed, is the proper user. For example, if a user attempts to access an Office365 user account with their laptop, and the user has their MFA-registered cell phone on their person, putting the primary device and the secondary device within close proximity, the MFA service can reasonably conclude that the user attempting to login is the proper user for that user account, and the MFA service will send the push notification to the secondary device.

On the other hand, if the account credentials for a user account of an application service have been stolen, and those valid credentials are used by a hacker to attempt to fraudulently access the account, the location of the primary device attempting to login to the user account, will assuredly be out of range of the threshold proximity. For example, a hacker with the stolen credentials would likely be attempting access to the account from a different country, region of a country, or at least a location a mile or kilometer or more away from the location of the secondary device. In this example, the MFA service will not send a push notification to the secondary device, thus, preventing any attempt at MFA fatigue by the hacker. In addition, the MFA service may instead send a notification to the secondary device that credentials associated with the user account may have been stolen or otherwise compromised, and prompt for the user associated with the user account to initiate a password change for the user account.

A threshold proximity between a primary device and a secondary device, may be defined as a close proximity, for example a proximity close enough for a primary and secondary device to be paired via Bluetooth. The threshold proximity will most likely be limited to a proximity in which a person may reasonable be in physical contact with both the primary device and the secondary device, or perhaps a few steps away, as by the nature of Bluetooth, the primary and secondary devices must be in a close proximity to facilitate pairing, typically no further apart than about 30 feet or 10 meters.

Additionally, once a session has been established between a primary device and a secured resource according to techniques describe herein, the MFA service will continuously monitor Bluetooth pairing information of the primary device and the secondary device to ensure that they remain paired. Once the threshold proximity is breached (the primary and secondary devices are no longer paired via Bluetooth) the MFA service can terminate the session with the secured resource. This will ensure that once a user having the secondary device on their person, steps away for the primary device connected to a secure resource, the primary device will not be susceptible to unauthorized activity by someone other than the proper registered user.

In some examples, the techniques of this disclosure may be used in cases where the same device can act as primary authentication device and secondary authentication device for the secured session. For instance, a secondary device (e.g., cell phone) may be used to log into a user's email account. In such cases, it is not possible to ensure the primary device and the secondary device are within a threshold proximity based on Bluetooth pairing. Thus, in this case, the device authenticator's HTTPs sends device information (e.g., GPS location, International Mobile Equipment Identity (IMEI), etc.) to the MFA service to validate the device information which has been collected from the MFA applications and registered with the MFA service. If the device information corresponds to the registered device information, then the device biometric or device login from the MFA application is invoked, making the secondary authentication the device authentication.

According to the technologies of this disclosure, several advantages and improvements in computer-related technology can be realized. For example, the techniques described herein prevent MFA fatigue by ensuring the primary device and the secondary device are within a threshold proximity for the initial determination of whether to allow a push notification to be sent to the secondary device in order to complete an MFA and allow connection to a secured resource. In addition, the continuous evaluation of Bluetooth pairing information between the primary device and the secondary device to determine if proximity exceeds a threshold proximity and should result in session termination is described. This improves the functioning of MFA systems by providing another layer of security and authentication. Additionally, the techniques of this disclosure allow for the termination of existing sessions between a primary device and a resource based on device proximity, which is indicative of whether the user is actually present at the primary device. This allows organizations to ensure even greater security for their resources by ensuring that the true user of the primary device be in proximity of the primary device in order for the primary device to have access to the resource. These and other advantages and improvements will be readily apparent to those having ordinary skill in the art.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 that may implement various aspects of the technologies described herein. In FIG. 1, various example steps (1-14) associated with the technologies described herein are shown. These steps illustrate an example data flow/process associated with using device proximity of a primary device and a secondary device to allow or deny push notifications to be sent for MFA verification, as well as to use device proximity to determine whether to terminate existing connections between the primary device and a resource(s).

The architecture 100 includes a primary device 102 and a secondary device 104. In the illustrative example, the primary device 102 represents a laptop and the secondary device 104 represents a cell phone. However, as noted above and herein, the primary device 102 and the secondary device 104 may be any type of electronic device capable of communicating data over a network. In architecture 100 the primary device 102 is a device that is being used to attempt access to a secure resource, and the secondary device 104 is a device used to allow or deny connections to a secured resource(s) (e.g., a user's cell phone). In architecture 100, both the primary device 102 and the secondary device 104 are registered with the MFA service 106, which is typical for a primary device that may be exclusively reserved for employment activities of a user (e.g., a user's work laptop). The primary device 102 may be configured with an MFA client agent to communicate with the MFA service 106. The secondary device 104 may be configured with an MFA application for displaying a push notification for allowing the primary device 102 to access a secured resource(s). Additionally, the Architecture 100 includes an MFA service 106 that provides for multi-factor authentication for users and devices attempting to connect to secured resources. The MFA service can ensure that users and devices attempting to connect to secured resources are legitimate, and in addition prevent fraudulent access by providing multiple layers of defense. Architecture 100 also illustrates an account login 108 utilized by a user associated with primary device 102 for inputting user credentials in an attempt to access a secured resource, such as application service 110. Additionally, architecture 100 also include a RADIUS server 112 for verifying user credentials (e.g., username and password) associated with a user account of a secured resource. Finally, architecture 100 include an MFA proxy 114 to initiate the second factor in the multi-factor authentication, in this example, a push notification to secondary device 104.

At (1) both the primary device 102 and secondary device 104 register with the MFA service 106. The primary device 102 registers as a device that will routinely be used to access secured resources protected by the MFA service 106. The secondary device 104 registers to be a secondary authentication device for a multi-factor authentication for secured resources. For example, the secondary device 104 is authorized to receive a push notification from the MFA service 106 to authenticate an attempted login of a secured resource. At (2) the primary device 102 and the secondary device 104 are within a close threshold proximity and are paired via Bluetooth.

At (3) the primary device 102 attempts to access a user account by inputting user credential at (4). The user credentials are input to an account login 108. Typically, the user credentials include a username and password associated with a user account of the secure resource as shown. At (5) the user credentials are sent to the secured resource to which access is being attempted. As illustrated in FIG. 1, the secured resource is an application service 110. However, the secured resource may be any appropriate resource such as an application, a web service, a virtual private network (VPN) headend service, a container-based application running on an application orchestration system, or the like. In some examples, the resource(s) may be cloud based resources, on-prem resources, and/or the like.

At (6) the application service 110 sends the user credentials to a RADIUS 112 server or the equivalent to determine whether the user credentials (username and password) are valid for the user account of the secured resource being accessed. At (7) RADIUS 112 will verify whether the credentials are valid. If they are not, the process does not continue, and the primary device 102 is notified on the account login 108 that the user credentials are not correct, and the login attempt is unsuccessful. If RADIUS 112 determines the credentials are valid, at (8) RADIUS 112 will notify an MFA proxy 114 to initiate a secondary authentication factor in multi-factor authentication process. However, instead of automatically sending a push notification to the secondary device 104 to authorize the login attempt, the MFA proxy 114 sends an indication to the MFA service 106 of the login attempt.

At (9) the MFA service 106 receives Bluetooth pairing information from an agent running on the primary device 102. The Bluetooth pairing information will include a verification that the primary device 102 and the secondary device 104 are presently paired via Bluetooth. At (10) The MFA service determines whether the primary device 102 and the secondary device 104 are within a close threshold proximity, based on the Bluetooth pairing information received at (9). If the Bluetooth pairing information indicated that the primary device 102 and the secondary device 104 are not paired via Bluetooth, the MFA service 106 will refrain from sending a push notification to the secondary device. Instead, the MFA service 106 may determine that there is a likelihood that the user login credentials have been compromised and the MFA service may send a notification to the secondary device of the potential compromise and prompt for a password change.

If the MFA service 106 determines that the primary device 102 and the secondary device 104 are within the threshold proximity, based on the Bluetooth pairing information indicating that the two devices are paired via Bluetooth, the MFA service will send the push notification to the secondary device 104 at (11). When the secondary device 104 receives the push, the MFA application on the secondary device may validate that the primary device 102 and the secondary device 104 are in fact paired via Bluetooth. If the Bluetooth connection has terminated, the MFA application will not display the push notification on the secondary device 104. If the MFA application verifies that the primary device 102 and secondary device 104 are paired via Bluetooth, the MFA application running on the secondary device 104 will display the push notification and the user associated with the secondary device 104 may then confirm access at (12) when the MFA push notification is received. When the MFA service 106 receives the confirmation from the secondary device 104, the MFA service 106 will send a notification that permission is granted at (13) to the application service 110. At (14) the application service will indicate that user account access is granted and proceed to grant access to the user account of the application service associated with the user credentials.

In some examples, once access has been granted at (14), the MFA service may continuously monitor the Bluetooth pairing information received form the agent running on the primary device 102 to determine whether the threshold proximity between the two devices is breached. If the proximity between primary device 102 and secondary device 104 exceeds the threshold proximity, the Bluetooth connection between the two devices will terminate and the MFA service 106 will terminate the connection between the primary device 102 and the application service 110. At which point, in order for the primary device 102 to access the application service 110, the process will commence at (2).

Figure 2:
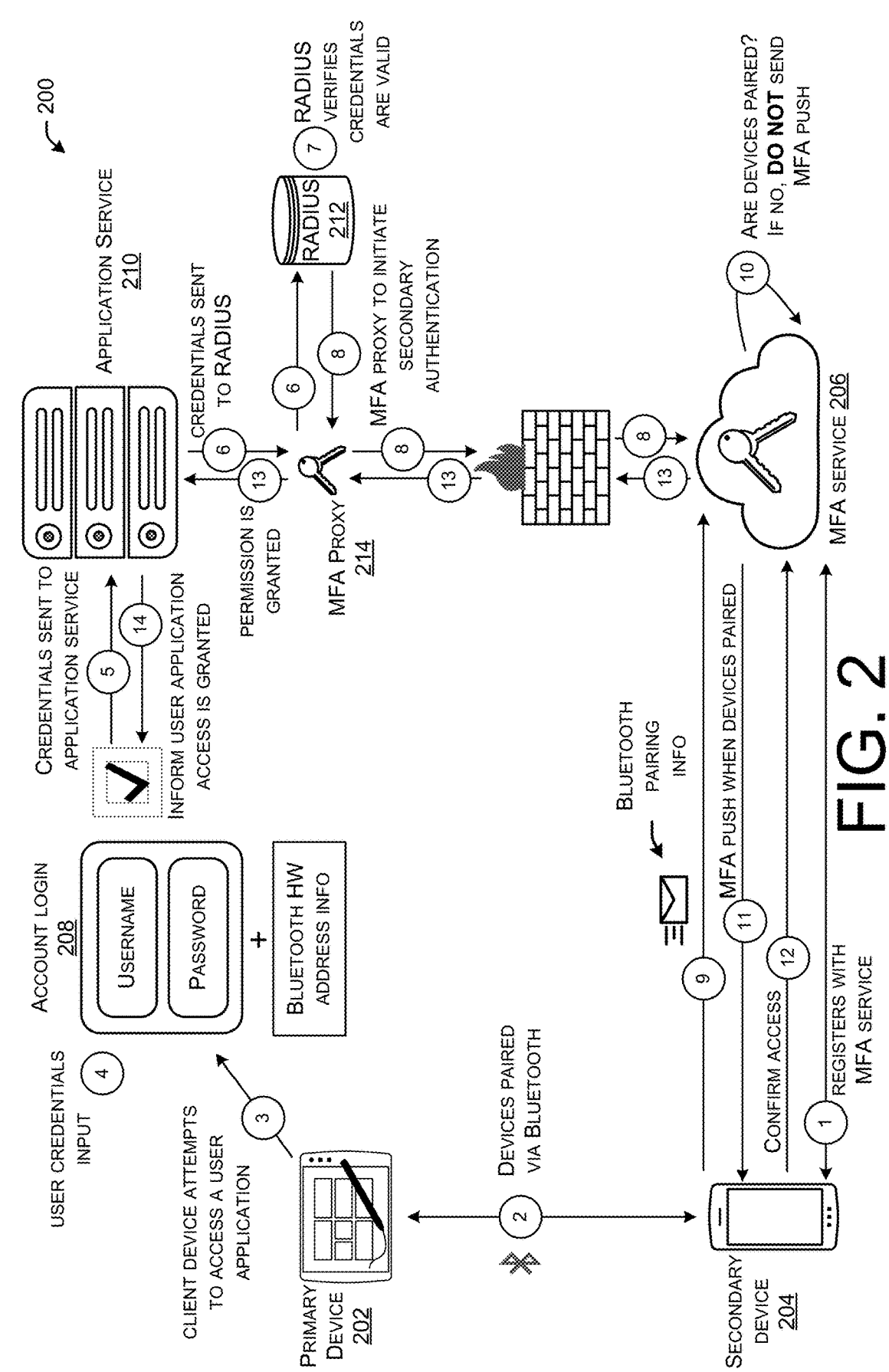
FIG. 2 illustrates an example architecture that may implement various aspects of the technologies directed to using device proximity of a primary device and a secondary device, where the primary device is not registered with an MFA service, to allow or deny MFA push notifications to be sent to allow or deny connections to network resource(s), and to terminate connections based on device proximity monitoring as described herein.

FIG. 2 illustrates an example architecture 200 that may implement various aspects of the technologies described here. The example architecture 200 is similar to example architecture 100 described with reference to FIG. 1. However, unlike FIG. 1 in which the primary device 102 is registered with the MFA service 106 and in configured to run MFA client agent that communicates with the MFA service 106, the primary device 202 in FIG. 2 is not registered with the MFA service and therefore is not configured with an MFA agent for communicating with the MFA service. The steps illustrated are an example data flow/process associated with using device proximity of a primary device and a secondary device, determined using Bluetooth pairing information, to allow or deny push notifications to be sent for MFA verification, as well as to use device proximity to determine whether to terminate existing connections to secured resource(s).

The architecture 200 includes a primary device 202 and a secondary device 204. In the illustrative example, the primary device 202 represents a tablet and the secondary device 204 represents a cell phone. However, as noted above and herein, the primary device 202 and the secondary device 204 may be any type of electronic device capable of communicating data over a network. In architecture 200 the primary device 202 is a device that is being used to attempt access to a secure resource, and the secondary device 204 is a device used to allow or deny connections to a secured resource(s) (e.g., a user's cell phone). In architecture 200, only the secondary device 204 is registered with the MFA service 206. The secondary device 204 may be configured with an MFA application for displaying a push notification for allowing the primary device 202 to access a secured resource(s). Additionally, the Architecture 200 includes an MFA service 206 that provides for multi-factor authentication for users and devices attempting to connect to secured resources. Architecture 200 also illustrates an account login 108 utilized by a user associated with primary device 202 for inputting user credentials in an attempt to access a secured resource, such as application service 210. Additionally, architecture 200 also include a RADIUS server 212 for verifying user credentials (e.g., username and password) associated with a user account of a secured resource. Finally, architecture 200 include an MFA proxy 214 to initiate the second factor in the multi-factor authentication, in this example, a push notification to secondary device 204.

At (1) the secondary device 204 registers with the MFA service 206. The secondary device 204 registers to be a secondary authentication device for a multi-factor authentication for secured resources. The secondary device is configured to run an MFA application to receive and display a push notification from the MFA service 206 to authenticate an attempted login of a secured resource by a primary device 202. At (2) the primary device 202 and the secondary device 204 are within a close threshold proximity and are paired via Bluetooth.

At (3) the primary device 202 attempts to access a user account by inputting user credential at (4). The user credentials are input into an account login 208. Typically, the user credentials include a username and password associated with a user account of the secure resource as shown. At (5) the user credentials are sent to the secured resource to which access is being attempted. As illustrated in FIG. 2, along with the user credential input in the account login, Bluetooth hardware address information about the primary device 202 is also sent for verification. For example, the Universally Unique Identifier (UUID) for the primary device 202 will be included when the login credentials are sent for verification.

At (6) the application service 210 sends the user credentials to a RADIUS 212 server or the equivalent to determine whether the user credentials (username and password) are valid for the user account of the secured resource being accessed. At (7) RADIUS 212 will verify whether the credentials are valid. If they are not, the process does not continue, and the primary device 102 is notified on the account login 208 that the user credentials are not correct, and the login attempt is unsuccessful. If RADIUS 212 determines the credentials are valid, at (8) RADIUS 212 will notify an MFA proxy 214 to initiate a secondary authentication factor in multi-factor authentication process. However, instead of automatically sending a push notification to the secondary device 204 to authorize the login attempt, the MFA proxy 214 sends an indication to the MFA service 206 of the login attempt. The indication also includes the UUID of the primary device 202.

At (9) the MFA service 206 receives Bluetooth pairing information from an application running on the secondary device 204. The Bluetooth pairing information will include a verification that the primary device 202, a device with the UUID as sent with the user credentials, and the secondary device 204 are presently paired via Bluetooth. At (10) The MFA service determines whether the primary device 202 and the secondary device 204 are within a close threshold proximity, based on the Bluetooth pairing information, including the UUID of the primary device 202 that the secondary device 204 is paired with, received at (9). If the Bluetooth pairing information indicates that the primary device 202 and the secondary device 204 are not paired via Bluetooth, the MFA service 206 will refrain from sending a push notification to the secondary device. Instead, the MFA service 206 may determine that there is a likelihood that the user login credentials have been compromised and the MFA service may send a notification to the secondary device of the potential compromise and prompt for a password change.

If the MFA service 206 determines that the primary device 202 and the secondary device 204 are within the threshold proximity, based on the Bluetooth pairing information indicating that the secondary device 204 is paired via Bluetooth with a device having the aforementioned UUID, the MFA service will send the push notification to the secondary device 204 at (11). The MFA application running on the secondary device 204 will display the push notification and a user associated with the secondary device 204 may then confirm access at (12) when the MFA push notification is received. When the MFA service 206 receives the confirmation from the secondary device 204, the MFA service 206 will send a notification that permission is granted at (13) to the application service 210. At (14) the application service will indicate that user account access is granted and proceed to grant access to the user account of the application service associated with the user credentials.

In some examples, once access has been granted at (14), the MFA service may continuously monitor the Bluetooth pairing information received form the application running on the secondary device 204 to determine whether the threshold proximity between the two devices is breached. If the proximity between primary device 202 and secondary device 204 exceeds the threshold proximity, the Bluetooth connection between the two devices will terminate and the MFA service 206 will terminate the connection between the primary device 202 and the application service 210. At which point, in order for the primary device 202 to access the application service 210, the process will commence at (2).

Figure 3:
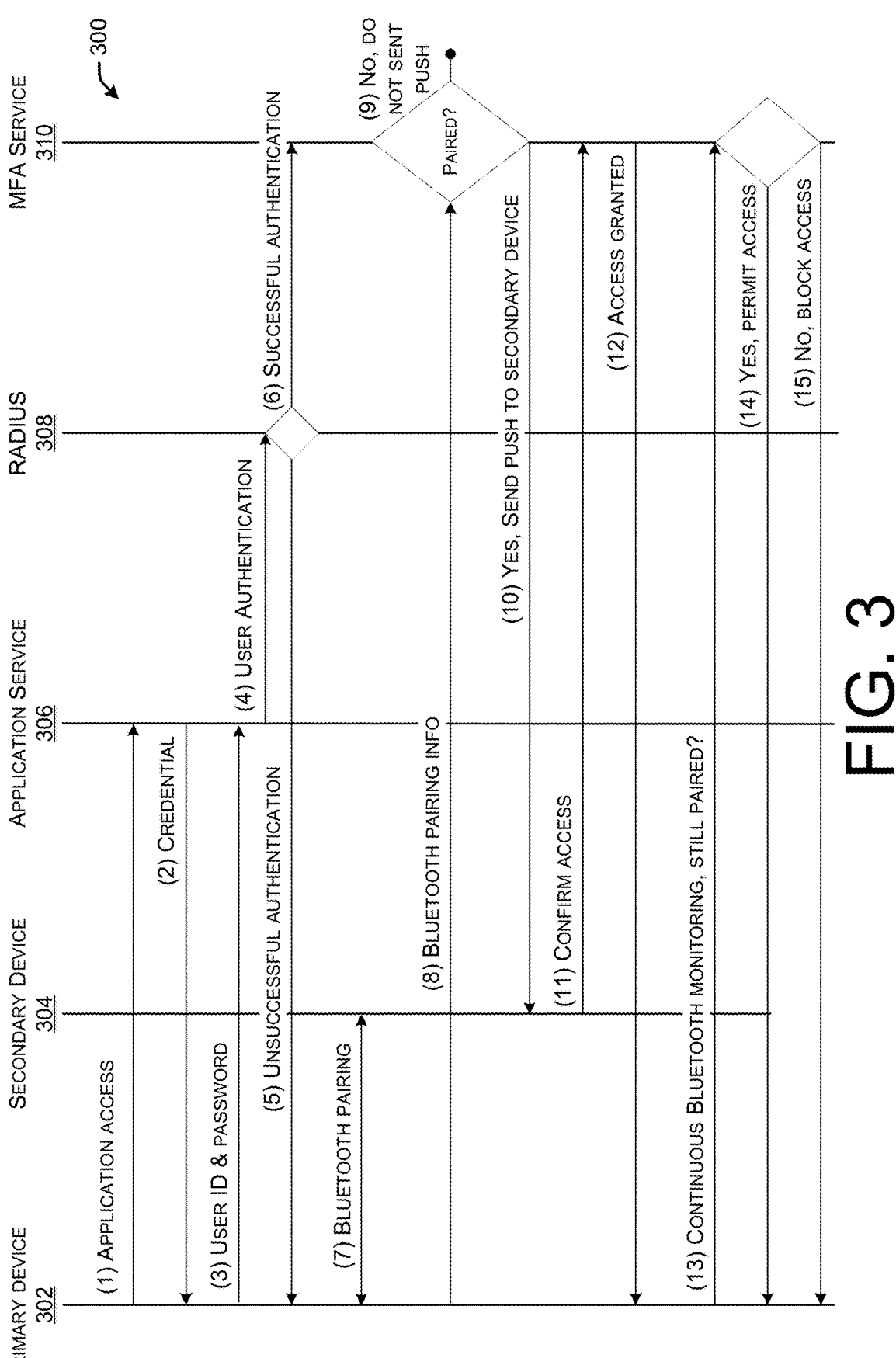
FIG. 3 illustrates an example of step-by-step communications to allow or deny MFA push notifications to be sent to allow, deny, or terminate connections to a network resource(s) based on proximity of a primary device and a secondary device.

FIG. 3 illustrates an example step-by-step communication flow 300 to allow or deny a push notification to be sent to a secondary device to allow or deny a connection to a network resource(s) by a primary device based on a proximity between the primary device and the secondary device. At (1) primary device 302 attempts to access a secured resource, in this example the application service 306. At (2) the application service 306 prompts for user credentials (e.g., user ID and password) to be input at the primary device 302, and at (3) the user ID and password (the credentials) are input at the primary device 302 and sent to the application service 306. For example, referring again to FIG. 1, a user may attempt via the primary device 102 to access the application service 110 by inputting user credentials (e.g., username and password) at an account login 108 of the primary device 102.

At (4) once the user credentials are received by the application service 306, the application service sends the credentials to RADIUS 308 for verification. If the user credentials are not valid, at (5) an unsuccessful authentication occurs and the primary device 302 is blocked from accessing a user account of the application service 306. If the user credentials are successfully verified by RADIUS, at (6) the MFA service 310 is notified of the successful user credential authentication. At (7) an MFA agent running on the primary device 302 will determine whether the primary device 302 and the secondary device 304 are paired via Bluetooth. At (8) Bluetooth pairing information is received by the MFA service 310 from an MFA agent running on the primary device 302. The Bluetooth pairing information includes whether the primary device 302 and secondary device 304 are paired via Bluetooth or not. At (9) A determination is made that the primary device 302 and secondary device 304 are not within a threshold proximity based on the Bluetooth information indicating that the two devices are not paired, thus the MFA service refrains from sending push notification to the secondary device 304. At (10) a push notification is sent to the secondary device 304 based on the Bluetooth pairing information indicating that the primary device 302 and the secondary device 304 are paired via Bluetooth, thus the two devices are within a threshold proximity to one another. At this point, the MFA application running on the secondary device may verify that the secondary device 304 is still paired via Bluetooth with the primary device 304. If the MFA application cannot verify the pairing, the push notification will not be displayed on the secondary device 304, if the pairing is verified, the push notification will be displayed on the primary device 302 and at (11) a user associated with the secondary device 304 may confirm access for the primary device 302 to connect to a user account of the application service 306. If the secondary device 304 confirms access after receiving the MFA push notification, at (12) access to the application service 306 is granted. For example, in FIG. 1, if the secondary device 104 confirms access when the push notification is received, access to the user account of the application service 110 is granted at primary device 102.

Additionally, at (13) the MFA service 310 may continuously monitor the Bluetooth information received from the MFA agent running on the primary device 302 and the MFA service will determine whether the two devices are continuously within the threshold proximity of each other based on the pairing information. At (14) if they stay within the threshold proximity (are still paired via Bluetooth), the MFA service will continue to permit access to the application service 306 by the primary device 302. If the threshold proximity between primary device 302 and secondary device 304 exceeds the threshold proximity (Bluetooth pairing terminates), at (15) the MFA service 310 will terminate the connection between the primary device 302 and the application service 306 and block access. If the primary device 302 wants to reconnect to the application service 306 a user must login again using their user credentials at (3). This will ensure that if a user walks away, with the secondary device 304 on their person, from the primary device 302 with an active connection to the application service 306, an unauthorized user may not be afforded access to the active connection, as once the threshold proximity is exceeded, the Bluetooth connection will be terminated resulting in the MFA service terminating the connection between the primary device 302 and the application service 306.

FIG. 4 is a flow diagram illustrating an example method 400 associated with the techniques described herein for determining whether to send a push notification to a secondary device for MFA verification. The logical operations described herein with respect to FIG. 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 402, an MFA service receives an indication from an application of a request for a user account to access the application service via a primary device, the request includes login credentials associated with the user account. For example, with reference to FIG. 1 the MFA service 106 will receive an indication from the application service 110 that a request has been made at the primary device 102 to access a user account with the application service 110. The access request includes user credentials, such as username and password, input into an account login 108. The application service 110 then sends the credentials to a RADIUS 112 server for verification, if the credentials are incorrect, the attempt is not successful and the primary device 102 will denied access. If the user credentials are valid, RADIUS 112 will request an MFA proxy 114 to initiate a secondary authentication.

At operation 404, using a PAN protocol, the MFA service determines whether the primary device and the secondary device are within a threshold proximity to each other. Conventionally, in a Multi-Factor Authentication, once user credentials are determined to be valid by RADIUS, a push notification will immediately be sent to the secondary device to initiate a second factor in the MFA process. However, accordingly to techniques described herein, prior to determining whether to send a push notification to the secondary device or not, the MFA service determines whether the primary device and the secondary device are within a predetermined threshold proximity of each other. For example, in FIG. 1 the MFA service 106 determine whether the primary device 102 and the secondary device 104 are within a threshold proximity using the Bluetooth pairing information send from an MFA agent running on the primary device 102. With reference to FIG. 2, the MFA service 206 determines whether primary device 202 and secondary device 204 are within a threshold proximity using the Bluetooth pairing information received form the MFA application running on the secondary device 204.

At operation 406, in response to the primary device and the secondary device being within the threshold proximity to each other, the MFA service determines to allow a push notification to be transmitted to the MFA registered device requesting authentication to grant access to the user account by the primary device. For example, in FIG. 1 the MFA service 106 determined that primary device 102 and secondary device 104 are within a threshold proximity based on the Bluetooth pairing information received from an MFA agent running on the primary device indicating that the two devices are paired via Bluetooth and the MFA service sends a push notification to the secondary device to initiate a second factor in the MFA process. Alternately or in addition, before displaying a push notification to a user to accept or deny access to a secure resource by the primary device 102, the MFA application on the secondary device 104 may verify that the secondary device 104 is still paired via Bluetooth with the primary device 102. If the secondary device 204 is still paired with the primary device, the push notification will be displayed, if the secondary device determines that it is not paired with the primary device, the push notification will not be displayed. In another example, with reference to FIG. 2 the MFA service 206 determines that primary device 202 and secondary device 204 are within the threshold proximity to each other based on the Bluetooth pairing information received form an MFA application running on the secondary device 204 that indicates that the secondary device 204 is paired with the primary device 202 via Bluetooth. Thus, MFA service 206 sends an MFA push notification to secondary device 204 to initiate a second factor authentication in for the MFA. The proximity between the primary device 202 and the secondary device 204 may be continuously monitored using the Bluetooth pairing information throughout the life of the authenticated session such that when the secondary device 204 does move away from the primary device 202 and is more than the threshold proximity away from the primary device 202 resulting in the Bluetooth connection being terminated, the MFA service may terminate the session between the primary device and the secured resource.

At operation 408, in response to the primary device and the secondary device not being within the threshold proximity to each other, the MFA device refrains from transmitting the push notification to the secondary device. For example, in FIG. 1 the MFA service 106 determines using the Bluetooth information received from the agent running on the primary device 102, that the primary device 102 is not paired with the secondary device 104. The fact that the two devices are not paired via Bluetooth means that the two devices are further than the threshold proximity. In another example, in FIG. 2 the MFA service 206 determines that the primary device 202 and the secondary device 204 are not within the threshold proximity to each other based on the Bluetooth information received from the MFA application running on the secondary device, and the MFA service refrains from sending a push notification to the secondary device 204. Thus, preventing a potential endless stream of push requests and thwarting any attempt at inflicting MFA fatigue on the legitimate user of secondary device 204. Additionally, in this example, the MFA service may conclude that the user credentials have likely been stolen based on the distance between primary device 202 and secondary device 204 exceeding the threshold. Thus, the MFA service may send a notification to the secondary device that the user credentials have likely been compromised and recommend or prompt the user of the secondary device to change a password associated with the user account.

Figure 5:
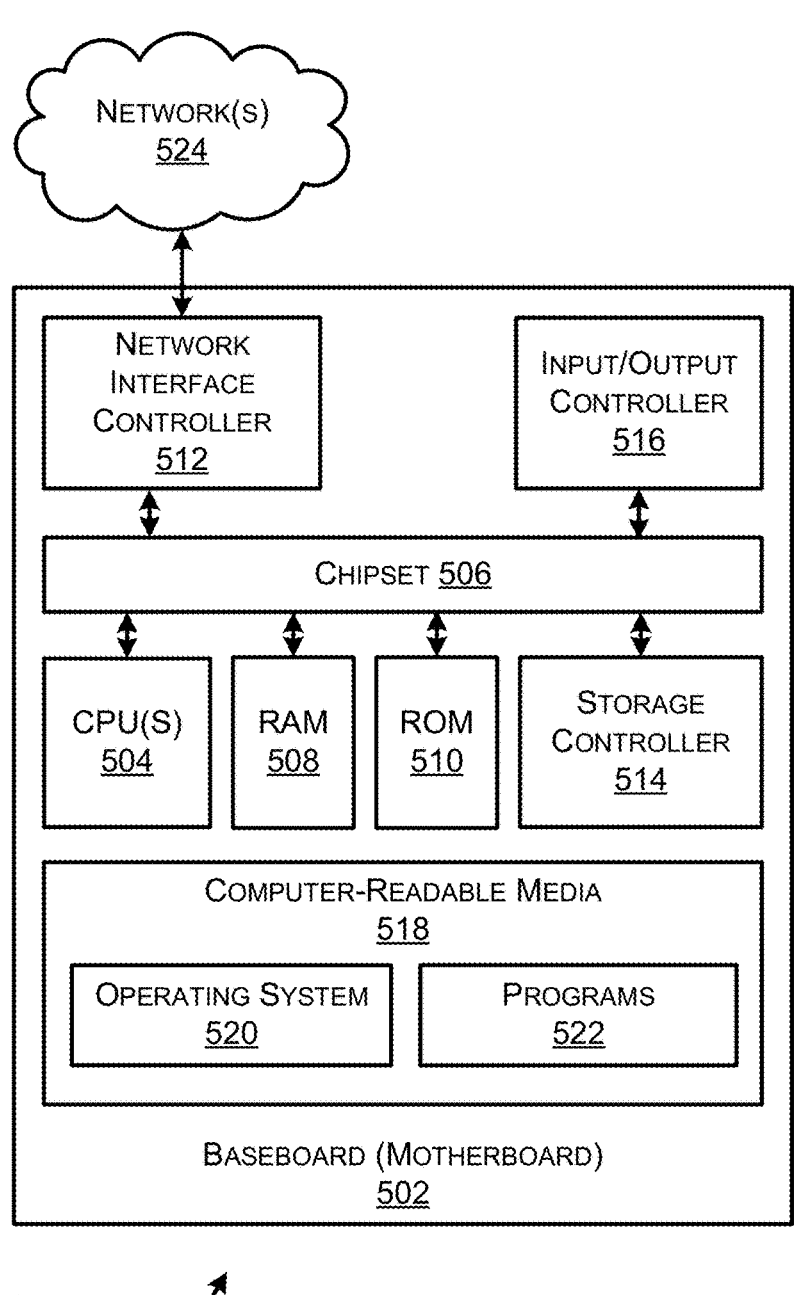
FIG. 5 is a computer architecture diagram showing an illustrative computer hardware architecture for implementing a computing device that can be utilized to implement aspects of the various technologies presented herein.

FIG. 5 is a computer architecture diagram showing an illustrative computer hardware architecture for implementing a computing device that can be utilized to implement aspects of the various technologies presented herein. The computer architecture shown in FIG. 5 illustrates a conventional server computer, network node (e.g., secure access node), router, workstation, desktop computer, laptop, tablet, network appliance, e-reader, smartphone, load balancer, or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network. The chipset 506 can include functionality for providing network connectivity through a NIC 512, such as a gigabit Ethernet adapter. The NIC 512 is capable of connecting the computer 500 to other computing devices over the network 524. It should be appreciated that multiple NICs 512 can be present in the computer 500, connecting the computer to other types of networks and remote computer systems. In some examples, the NIC 512 may be configured to perform at least some of the techniques described herein.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the architecture 100 and or any components included therein, may be supported by one or more devices similar to computer 500. Stated otherwise, some or all of the operations performed by the architecture 100, and or any components included therein, may be performed by one or more computer devices 500 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500).

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes and functionality described above with regard to FIGS. 1-4, and herein. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The computer 500 may include one or more hardware processors (processors) configured to execute one or more stored instructions. The processor(s) may comprise one or more cores. Further, the computer 500 may include one or more network interfaces configured to provide communications between the computer 500 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for using device proximity of a primary device and a secondary device to allow or deny connections to secured resource(s), as well as terminate existing connections to the secured resource(s).

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving, by a Multi-Factor Authentication (MFA) service and from an application service, an indication of a request for a user account to access the application service via a primary device, the request including login credentials associated with the user account;

determining, using a personal area networking (PAN) protocol, that the primary device and a secondary device are not within a threshold proximity to each other;

and in response to determining that the primary device and the secondary device are not within the threshold proximity to each other, refraining from transmitting a push notification to the secondary device, wherein the push notification includes an authentication request generated by the MFA service requesting that the user account authenticate to gain access to the application service.

2. The method of claim 1, further comprising:

transmitting a notification to the secondary device that the login credentials associated with the user account may have been stolen; and prompting for a change to a password associated with the user account.

3. The method of claim 1, further comprising receiving, from an agent running on the primary device, information indicating whether the primary device and secondary device are paired via the PAN protocol.

4. The method of claim 3, further comprising:

monitoring the PAN protocol pairing information received from the agent running on the primary device; and terminating a communication session between the primary device and the application service when the PAN protocol pairing information indicates the primary device and secondary device are not paired via the PAN protocol.

5. The method of claim 1, wherein the request for the user account to access the application service via the primary device, also includes a Universally Unique Identifier (UUID) for the primary device and further comprising receiving, from the secondary device, PAN protocol pairing information indicating whether the secondary device is paired with the primary device having the UUID included in the request.

6. The method of claim 5, further comprising:

monitoring the PAN protocol pairing information received from the secondary device; and terminating a communication session between the primary device and the application service when the PAN protocol pairing information indicates the primary device and secondary device are not paired via the PAN protocol.

7. The method of claim 1, further comprising:

determining, using the personal area networking (PAN) protocol, that the primary device and a secondary device have moved within a threshold proximity to each other; and in response to the primary device and the secondary device being within the threshold proximity to each other, determining, at the MFA service, to allow a push notification to be transmitted to the secondary device requesting user input to grant access to the user account by the primary device.

8. A system comprising:

one or more processors; and one or more non-transitory computer-readable media storing instructions that, when executed, cause the one or more processors to perform operations comprising:

receiving, by a Multi-Factor Authentication (MFA) service and from an application service, an indication of a request for a user account to access the application service via a primary device, the request including login credentials associated with the user account;

determining, using a personal area networking (PAN) protocol, that the primary device and a secondary device are not within a threshold proximity to each other; and in response to determining that the primary device and the secondary device are not within the threshold proximity to each other, refraining from transmitting a push notification to the secondary device, wherein the push notification includes an authentication request generated by the MFA service requesting that the user account authenticate to gain access to the application service.

9. The system of claim 8, the operations further comprising:

transmitting a notification to the secondary device that the login credentials associated with the user account may have been stolen; and prompting for a change to a password associated with the user account.

10. The system of claim 8, the operations further comprising receiving, from an agent running on the primary device, information indicating whether the primary device and secondary device are paired via the PAN protocol.

11. The system of claim 10, the operations further comprising:

monitoring the PAN protocol pairing information received from the agent running on the primary device; and terminating a communication session between the primary device and the application service when the PAN protocol pairing information indicates the primary device and secondary device are not paired via the PAN protocol.

12. The system of claim 8, wherein the request for the user account to access the application service via the primary device, also includes a Universally Unique Identifier (UUID) for the primary device and the operations further comprising receiving, from the secondary device, PAN protocol pairing information indicating whether the secondary device is paired with the primary device having the UUID included in the request.

13. The system of claim 12, the operations further comprising:

monitoring the PAN protocol pairing information received from the secondary device; and terminating a communication session between the primary device and the application service when the PAN protocol pairing information indicates the primary device and secondary device are not paired via the PAN protocol.

14. The system of claim 8, the operations further comprising:

determining, using the personal area networking (PAN) protocol, that the primary device and a secondary device have moved within a threshold proximity to each other; and in response to the primary device and the secondary device being within the threshold proximity to each other, determining, at the MFA service, to allow a push notification to be transmitted to the secondary device requesting user input to grant access to the user account by the primary device.

15. One or more non-transitory computer-readable media storing instructions that, when executed, cause one or more processors to perform operations comprising:

receiving, by a Multi-Factor Authentication (MFA) service and from an application service, an indication of a request for a user account to access the application service via a primary device, the request including login credentials associated with the user account;

determining, using a personal area networking (PAN) protocol, that the primary device and a secondary device are not within a threshold proximity to each other;

in response to determining that the primary device and the secondary device are not within the threshold proximity to each other, refraining from transmitting a push notification to the secondary device, wherein the push notification includes an authentication request generated by the MFA service requesting that the user account authenticate to gain access to the application service.

16. The one or more non-transitory computer-readable media of claim 15, the operations further comprising:

transmitting a notification to the secondary device that the login credentials associated with the user account may have been stolen; and prompting for a change to a password associated with the user account.

17. The one or more non-transitory computer-readable media of claim 15, the operations further comprising receiving, from an agent running on the primary device, information indicating whether the primary device and secondary device are paired via the PAN protocol.

18. The one or more non-transitory computer-readable media of claim 17, the operations further comprising:

monitoring the PAN protocol pairing information received from the agent running on the primary device; and terminating a communication session between the primary device and the application service when the PAN protocol pairing information indicates the primary device and secondary device are not paired via the PAN protocol.

19. The one or more non-transitory computer-readable media of claim 15, wherein the request for the user account to access the application service via the primary device, also includes a Universally Unique Identifier (UUID) for the primary device and the operations further comprising receiving, from the secondary device, PAN protocol pairing information indicating whether the secondary device is paired with the primary device having the UUID included in the request.

20. The one or more non-transitory computer-readable media of claim 19, the operations further comprising:

monitoring the PAN protocol pairing information received from the secondary device; and terminating a communication session between the primary device and the application service when the PAN protocol pairing information indicates the primary device and secondary device are not paired via the PAN protocol.

* * * * *